(12) United States Patent
D'Sidocky et al.

(10) Patent No.: US 7,674,344 B2
(45) Date of Patent: *Mar. 9, 2010

(54) PNEUMATIC TIRE WITH DEPOLYMERIZED BUTYL RUBBER-BASED BUILT-IN SEALANT PREPARED WITH ACTIVATED ORGANOPEROXIDE

(75) Inventors: Richard Michael D'Sidocky, Ravenna, OH (US); Jennifer Elizabeth Wall, Massillon, OH (US); John Eugene Varner, Barberton, OH (US); Denise Jeannette Keith, Akron, OH (US); Joseph Alan Incavo, Hudson, OH (US); Donald Ray Lay, Revenna, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 214 days.

This patent is subject to a terminal disclaimer.

(21) Appl. No.: 11/212,525

(22) Filed: Aug. 26, 2005

(65) Prior Publication Data

US 2007/0044883 A1    Mar. 1, 2007

(51) Int. Cl.
*B60C 5/00* (2006.01)
*B60C 5/12* (2006.01)
*B60C 5/14* (2006.01)
*B29D 30/00* (2006.01)
*B29D 30/06* (2006.01)

(52) U.S. Cl. .................. 156/110.1; 156/115; 152/502; 152/503; 152/504

(58) Field of Classification Search ................ 156/115, 156/502, 503; 152/504
See application file for complete search history.

(56) References Cited

U.S. PATENT DOCUMENTS

| | | | |
|---|---|---|---|
| 1,239,291 A | 9/1917 | Morse | |
| 2,877,819 A | 3/1959 | Gibbs | 152/347 |
| 3,048,509 A | 8/1962 | Sweet et al. | 154/43.5 |
| 3,563,294 A | 2/1971 | Chien | 152/346 |
| 4,140,167 A | 2/1979 | Bohm et al. | 152/346 |
| 4,171,237 A | 10/1979 | Bohm et al. | 156/115 |
| 4,206,796 A | 6/1980 | Chemizard | 152/347 |
| 4,228,839 A | 10/1980 | Bohm et al. | 152/347 |
| 4,286,643 A | 9/1981 | Chemizard et al. | 152/347 |
| 4,359,078 A | 11/1982 | Egan | 152/347 |
| 4,444,294 A | 4/1984 | Yoshigai | 188/24.11 |
| 4,895,610 A | 1/1990 | Egan | 156/115 |
| 4,919,183 A | 4/1990 | Dobson | 152/502 |
| 4,966,213 A | 10/1990 | Kawaguchi | 152/504 |
| 5,777,013 A * | 7/1998 | Gardiner et al. | 524/274 |
| 6,077,890 A * | 6/2000 | Hudson et al. | 524/100 |
| 6,344,506 B2 * | 2/2002 | Vasseur | 524/91 |
| 2003/0087998 A1 | 5/2003 | Malik et al. | 524/99 |
| 2004/0159386 A1 | 8/2004 | Deevers et al. | 152/503 |
| 2005/0034799 A1 | 2/2005 | Serra et al. | 152/503 |
| 2005/0113502 A1 | 5/2005 | Wall et al. | 524/425 |

FOREIGN PATENT DOCUMENTS

WO    WO 99/48813    * 9/1999

OTHER PUBLICATIONS www.specialchem4adhesives.com/tc/uv-light-stabilizers/index.aspx?ad=hals, 2009.*

* cited by examiner

*Primary Examiner*—Justin Fischer
(74) *Attorney, Agent, or Firm*—Henry C. Young, Jr.

(57) ABSTRACT

The present invention relates to a pneumatic tire with a built-in sealant layer comprised of a depolymerized butyl rubber based sealant precursor. The butyl rubber of the built-in sealant precursor composition is depolymerized in situ within the tire with an activated free radical generating organoperoxide. The organoperoxide is activated with a 2,2,6,6-tetra alkyl piperidine hindered amine. Representative of such hindered amines are, for example, a poly[[6-[1,1,3,3,-tetramethylbutyl)amino]-s-triazine-2,4-diyl][2,2,6,6,-tetramethyl-4-piperidyl)imino]hexamethylene[(2,2,6,6-tetramethyl-4-piperidyl)imino]] compound. The sealant layer, if desired, may be of a color which contrasts with black. For such purpose the sealant layer may contain a colorant of a non-black color to a substantial exclusion of carbon black. The butyl rubber-based sealant precursor is built into the tire as a layer to form a tire assembly wherein the butyl rubber-based composite portion of the sealant precursor layer is at least partially depolymerized by a said activated organoperoxide during a subsequent curing of the tire at an elevated temperature in a suitable mold to form the tire having the resultant built-in sealant layer. The sealant composition may additionally contain conventional clay, exfoliated intercalated clay platelets and/or calcium carbonate.

12 Claims, No Drawings

PNEUMATIC TIRE WITH DEPOLYMERIZED BUTYL RUBBER-BASED BUILT-IN SEALANT PREPARED WITH ACTIVATED ORGANOPEROXIDE

FIELD OF THE INVENTION

The present invention relates to a pneumatic tire with a built-in sealant layer comprised of a depolymerized butyl rubber based sealant precursor. The butyl rubber of the built-in sealant precursor composition is depolymerized in situ within the tire with an activated free radical generating organoperoxide. The organoperoxide is activated with a 2,2,6,6-tetra alkyl piperidine hindered amine. Representative of such hindered amines are, for example, a poly[[6-[1,1,3,3,-tetramethylbutyl)amino]-s-triazine-2,4-diyl][2,2,6,6,-tetramethyl-4-piperidyl)imino]hexamethylene[(2,2,6,6-tetramethyl-4-piperidyl)imino]] compound. The sealant layer, if desired, may be of a color which contrasts with black. For such purpose the sealant layer may contain a colorant of a non-black color to a substantial exclusion of carbon black. The butyl rubber-based sealant precursor is built into the tire as a layer to form a tire assembly wherein the butyl rubber-based composite portion of the sealant precursor layer is at least partially depolymerized by a said activated organoperoxide during a subsequent curing of the tire at an elevated temperature in a suitable mold to form the tire having the resultant built-in sealant layer. The sealant composition may additionally contain conventional clay, exfoliated intercalated clay platelets and/or calcium carbonate.

BACKGROUND OF THE INVENTION

Various pneumatic tires have been proposed which contain a built-in sealant layer based upon a depolymerized butyl rubber layer.

For example, in U.S. Pat. No. 4,895,610 it is proposed to build a layer of butyl rubber-based composition into a tire which contains a polyisobutylene polymer and an organoperoxide, following which under a condition of elevated temperature used to cure the tire, a major portion of the butyl rubber is presented as being depolymerized to form a tacky material which has puncture sealant properties.

U.S. Pat. Nos. 4,228,839, 4,171,237 and 4,140,167 also relate to a sealant layer in a tire formed by depolymerizing and crosslinking a butyl rubber-based rubber composition, particularly by irradiation treatment.

U.S. Patent Application Publication No. 2005/0034799 A1 relates to a tire with built-in sealant comprised of a partially depolymerized butyl rubber via an organoperoxide which contains a dispersion of particulate pre-cured rubber particles.

U.S. patent application Ser. No. 10/368,259, filed Feb. 17, 2003, relates to a tire with built-in sealant comprised of a partially depolymerized butyl rubber via an organoperoxide which contains a particulate filler comprised of carbon black and/or coal dust and, optionally short fibers, hollow glass microspheres and rubber processing oil wherein the sealant may also contain a liquid diene-based polymer.

U.S. Patent Application Publication No. 2005/0034799 A1 relates to a self sealing tire containing a sealing material which may be contained within the tire and which may be comprised of a thermally degraded butyl rubber with an organic peroxide and containing a reinforcing filler.

U.S. Patent Application Publication No. 2005/0113502 A1 relates to a tire with a built-in colored sealant layer.

Additional patents which relate to various tire constructions which may involve built-in or built-on sealants for tires such as for example, U.S. Pat. Nos. 1,239,291, 2,877,819, 3,048,509, 3,563,294, 4,206,796, 4,286,643, 4,359,078, 4,444,294, 4,895,610, 4,919,183 and 4,966,213.

Further, U.S. Pat. No. 6,767,937 and U.S. Patent Application Publication No. 2003/0087998 A1 relate to various 2,2,6,6-tetra alkyl piperidine hindered amines for use in stabilizing various cellulose ester based polymer coatings and films (said U.S. Pat. No. 6,767,937) and for light stabilizing various thermoplastic organic polymers selected from polyolefins and copolymers and blends thereof (said U.S. Patent Application Publication No. 2003/0087998 A1).

In one aspect, the various built-in sealant layers for the pneumatic tires which are derived from a depolymerization of a butyl rubber-based sealant precursor composition typically contain a rubber reinforcing carbon black filler and are therefore black in color.

For this invention, it is desired to provide a built-in sealant layer for a pneumatic tire which is derived from a depolymerization of a butyl rubber-based sealant precursor composition which is of a black color (resulting from an inclusion of carbon black) or a color other than black (resulting from an inclusion of a colorant with a minimal, if any carbon black content), where the sealant of other than black color may be used as an aid to identify a puncture wound in a carbon black reinforced innerliner, tread and/or sidewall of said tire, depending somewhat upon the position of the built-in sealant layer, because of its contrasting color. Therefore, in one aspect, it is envisioned that such a non-black colored sealant layer is substantially exclusive of carbon black and particularly substantially exclusive of a rubber reinforcing carbon black. By the term "substantially exclusive of" carbon black it is intended that only a minimal amount, preferably none, of carbon black is present such as, for example, an impurity amount (e.g. less than about 0.1 phr) of carbon black, alternately an amount of up to about 2, preferably less than about 0.5, phr of carbon black, may be present so long as the sealant layer is of a color other than black and preferably contrasting with black colored (carbon black reinforcement containing) tire components which adjoin the built in sealant layer such as, for example, a tire innerliner component.

In practice, built-in sealants for tires based upon organoperoxide depolymerized butyl rubber have heretofore, in general, relied upon containing rubber reinforcing carbon black to provide a degree of reinforcement and thereby a suitable rubber viscosity to enable the sealant precursor composition to be conveniently processable both by formation into a suitable rubber sheet whether by extrusion or calendering and, also, by handling to build a sheet, or layer, of the sealant precursor composition into a tire assembly. Further, the presence of the rubber reinforcing carbon black is relied upon to provide a suitable viscosity of the built-in sealant in order to promote the stability of the sealant composition.

However, for this invention, synthetic, amorphous silica (aggregates of primary silica particles), preferably in the form of a precipitated silica, may be used as a primary reinforcing filler for the butyl rubber-based sealant precursor composition instead of rubber reinforcing carbon black where it is desired that the built in sealant is of a color other than of a black color.

In another aspect of the invention, a portion of the precipitated silica may be replaced by fillers such as, for example, clay, for example kaolin clay and calcium carbonate for which, therefore, the butyl rubber-based sealant precursor may contain one or more of such additional fillers in addition to the precipitated silica.

Significant challenges are presented in the use of the synthetic, amorphous silica, particularly precipitated silica, as well as the inclusion of the aforesaid additional fillers.

For example, contrary to rubber reinforcing carbon black, such precipitated silica, (e.g. precipitated silica aggregates of primary silica particles), normally contains a significant presence of water of hydration, and/or water of association on its surface as well as a significant presence of hydroxyl groups (e.g. silanol groups). The clay and calcium carbonate may also contain an associated water moiety.

While the mechanism may not be fully understood, it is envisioned that at least a portion of such water, and possibly a portion of such hydroxyl groups, is available to prematurely decompose the organoperoxide intended to be used to depolymerize the butyl rubber in the sealant precursor composition.

It is considered herein that such premature decomposition of the organoperoxide, whether by presence of the water of hydration and/or association or by the presence of the hydroxyl groups, may adversely affect the free radical generating activity of the organoperoxide for a timely depolymerization of the butyl rubber after the sealant precursor layer is built into the tire assembly and the tire is cured at an elevated temperature. Such prematurely formed free radicals may become associated with the silica, and possibly the clay and calcium carbonate, rather than be involved with the desired depolymerization of the butyl rubber. It is further envisioned that if excess organoperoxide is added to allow for such premature decomposition, a portion of such excess organoperoxide may later or otherwise gradually become available to interact with associated rubber layers of the tire assembly, or construction, adjacent to the built-in sealant.

In order to inhibit, retard and/or significantly prevent significant contact of such water moieties and hydroxyl groups of the amorphous silica aggregates with the organoperoxide, the synthetic amorphous silica may be treated in situ within the rubber composition prior to addition of the organoperoxide, or may be pre-treated prior to its addition to the rubber composition with a low molecular weight polyalkylene oxide polymer, which might sometimes be referred to as a polyalkylene glycol; with an alkylsilane, a coupling agent having a moiety reactive with the hydroxyl groups on the silica and another moiety which is normally interactive with carbon-to-carbon double bonds of an elastomer or by a combination of alkylsilane (e.g. alkoxysilane) and coupling agent.

An important aspect of this invention is providing a pneumatic tire with a built-in black or non-black colored sealant layer positioned (sandwiched) between dimensionally stable sulfur vulcanized rubber layers (e.g. between a tire inner liner rubber layer and tire carcass) which promotes sealing against an externally puncturing object to prevent, or significantly retard, leakage of gas (e.g. air) from the tire cavity through the puncture to the outside of the tire by allowing the pressure within the tire cavity (air pressure greater than ambient atmospheric pressure) to press the sealant against the puncturing object or the cavity caused by the puncturing object.

In the description of this invention, the term "phr" is used to designate parts by weight of an ingredient per 100 parts of elastomer unless otherwise indicated. The terms "elastomer" and "rubber" are used interchangeably unless otherwise indicated. The terms "cure" and "vulcanize" are used interchangeably unless otherwise indicated.

SUMMARY AND PRACTICE OF THE INVENTION

In accordance with this invention, a process of providing a pneumatic rubber tire having a built-in puncture sealing layer comprises:

(A) building a tire having a built-in puncture sealing precursor layer of a composition comprised of butyl rubber, organoperoxide and an activating agent for said organoperoxide, wherein said activating agent is a 2,2,6,6-tetra alkyl piperidine hindered amine, and (B) partially depolymerizing said butyl rubber in situ within said puncture sealing precursor layer in said tire with free radicals generated by said organoperoxide, wherein said free radical generation by said organoperoxide is activated and promoted by said activating agent in situ within said puncture sealing layer to partially depolymerize said butyl rubber and thereby form said built-in puncture sealing layer.

In further accordance with this invention, for said process said sealant precursor layer composition is comprised of said butyl rubber, organoperoxide and activating agent, and, based upon parts by weight per 100 parts by weight rubber (phr):

(A) about 25 to about 100 phr particulate reinforcing filler comprised of:
(1) about 25 to about 100 phr of precipitated silica and from zero up to about 5 phr of carbon black, so long as said sealant layer is of a non-black color, wherein said carbon black is a rubber reinforcing carbon black, or;
(2) about 5 to about 50 phr of precipitated silica and from 10 to about 50 phr of carbon black so long as the sealant layer is of a black color, wherein said carbon black is a rubber reinforcing carbon black;
(3) from zero to 20 phr of additional filler comprised of at least one of clay calcium carbonate and corn cob granules or their mixtures;

(B) from zero to 6 phr of short organic fibers;

(C) optionally a colorant of other than a black color, where it is desired that said sealant layer is of a non-black color, wherein said colorant is comprised of at least one of organic pigments, inorganic pigments and dyes, preferably from organic pigments and inorganic pigments;

(D) from zero to about 20 phr of rubber processing oil.

In additional accordance with this invention a pneumatic tire having a built-in sealant is provided as being prepared by said process.

In further accordance with this invention, a pneumatic rubber tire is provided having a built-in puncture sealing layer;

wherein said puncture sealing layer is comprised of an organoperoxide-partially depolymerized butyl rubber and activation agent (e.g. residual activation agent) for said organoperoxide (said butyl rubber having been partially depolymerized by a organoperoxide activated by an activation agent in situ within a puncture sealing layer precursor composition built in the pneumatic tire);

wherein said activation agent is a 2,2,6,6-tetra alkyl piperidine hindered amine.

In practice, said built-in sealant layer may be covered by at least one tire rubber innerliner layer.

In practice, said built-in puncture sealing layer may be a rubber composition comprised of, based upon parts by weight per 100 parts by weight partially depolymerized polymer comprised of butyl rubber (phr):

(A) organoperoxide partially depolymerized polymer comprised of an activated organoperoxide partially depolymerized rubber as an organoperoxide partially depolymerized butyl rubber;

wherein said activated organoperoxide is an organoperoxide activated by an inclusion in said rubber composition of a 2,2,6,6-tetra alkyl piperidine hindered amine, wherein said butyl rubber is a copolymer comprised of isobutylene and isoprene comprised of about 0.5 to about 5, preferably within a range of from 0.5 to one, percent units derived from isoprene, and correspondingly from about 95 to about 99.5, preferably within a range of from 99 to 99.5, weight percent units derived from isobutylene;

(B) about 25 to about 100, alternately about 30 to about 75, phr particulate reinforcing filler comprised of:

(1) about 25 to about 100, alternately from 30 to 75 phr of precipitated silica (synthetic amorphous silica), and from zero up to about 5, preferably about zero, phr of carbon black, so long as said sealant layer is of a non-black color, wherein said carbon black is preferably a rubber reinforcing carbon black, or;

(2) about 5 to about 50 phr of precipitated silica and from 10 to about 50 phr of carbon black so long as the sealant layer is of a black color, wherein said carbon black is preferably a rubber reinforcing carbon black;

(3) from zero to 20, alternately from 5 to 15, phr of additional filler comprised of at least one of clay and calcium carbonate or their mixtures;

(C) from zero to 6, alternately about 0.5 to about 5, phr of short organic fibers;

(D) optionally a colorant of other than a black color (particularly where it is desired that said sealant layer is of a non-black color) wherein said colorant is comprised of at least one of organic pigments, inorganic pigments and dyes, preferably from organic pigments and inorganic pigments;

(E) from zero to about 20, alternately about 2 to about 15, phr of rubber processing oil, preferably a rubber processing oil having a maximum aromatic content of about 15 weight percent, and preferably a naphthenic content in a range of from about 35 to about 45 weight percent and preferably a paraffinic content in a range of about 45 to about 55 weight percent.

In practice, for said process and for said pneumatic tire, said 2,2,6,6-tetra alkyl piperidine hindered amine may be comprised of poly[[6-[1,1,3,3,-tetramethylbutyl) amino]-s-triazine-2,4-diyl][2,2,6,6,-tetramethyl-4-piperidyl)imino] hexamethylene[(2,2,6,6-tetramethyl-4-piperidyl)imino]] compound (which may be referred to herein as "PTP"), bis (2,2,6,6-tetramethyl-4-piperidinyl)sebacate or their mixture.

In practice, for said process and for said tire, said butyl rubber is a copolymer comprised of isobutylene and a conjugated diene comprised of isoprene, wherein said butyl rubber is comprised of about 0.5 to about 1 percent units derived from isoprene, and correspondingly from about 99 to 99.5, weight percent units derived from isobutylene.

A representative example of said PTP, or poly[[6-[1,1,3,3,-tetramethylbutyl)amino]-s-triazine-2,4-diyl][2,2,6,6,-tetramethyl-4-piperidyl)imino]hexamethylene[(2,2,6,6-tetramethyl-4-piperidyl)imino]] compound, is Ciba Chimassorb 994 FDL™ from the CIBA Company.

Additional representative hindered amines as mixtures of 2,2,6,6-tetra alkyl piperidine hindered amines which contain said PTP are, for example as Irgastab FS410 FF™ and Irgastab FS811 FF™, also from the CIBA Company.

The Irgastab FS410 FF is understood as being reported by the CIBA Company as being composed of a 50/50 mixture of said PTP and an oxidized bis(halogenated tallow alkyl amine).

The Irgastab FS811 FF is understood as being reported by the CIBA Company as being composed of a mixture of said PTP, an oxidized bis(halogenated tallow alkyl amine) and bis(2,2,6,6-tetramethyl-4-piperidinyl)sebacate.

While the mechanism may not be fully understood, an important aspect of the invention is the observation that an apparent activation of the organoperoxide occurs with the inclusion of the 2,2,6,6-tetra alkyl piperidine based hindered amine, and particularly the PTP, in a sense of enabling a reduction in the amount of the organoperoxide to more efficiently depolymerize the butyl rubber in the formation of the built-in sealant layer.

In practice, as hereinbefore point out, representative examples of such 2,2,6,6-tetra alkyl piperidine based hindered amines are, for example, poly[[6-[1,1,3,3,-tetramethylbutyl)amino]-s-triazine-2,4-diyl][2,2,6,6,-tetramethyl-4-piperidyl)imino]hexamethylene[(2,2,6,6-tetramethyl-4-piperidyl)imino]] compound (referred to herein as "PTP") and bis(2,2,6,6-tetramethyl-4-piperidinyl)sebacate and their mixtures.

In practice, exemplary of composites which contain, and therefore are comprised of, said PTP are composites comprised of said PTP which may also comprise said bis (2,2,6, 6-tetramethyl-4-piperidinyl)sebacate and which may also optionally contain an oxidized bis(halogenated tallow alkyl amine).

In practice, the aspect of utilizing said 2,2,6,6-tetra alkyl piperidine based hindered amines, and particularly said PTP or composites of 2,2,6,6-tetra alkyl piperidine based hindered amines which contain (include) said PTP to activate the organoperoxide in the depolymerization of the butyl rubber of the sealant precursor is considered herein to be important in order to reduce as much as possible the concentration of the organoperoxide in the sealant precursor butyl rubber-based composition, as well as excess unreacted organoperoxide which may remain in the resultant built-in sealant layer which may, in turn, gradually become available to contact rubber components of the tire adjacent to the built-in sealant layer.

In practice, said sealant layer is desirably positioned between a carbon black reinforced rubber innerliner layer of the tire and tire carcass, or between two carbon black reinforced tire rubber innerliner layers. Said tire typically has a rubber tread and rubber sidewall containing rubber reinforcing carbon black.

A significant aspect of using a built-in sealant of a non-black color, is the use of such built in sealant as an aid to:

(A) identify a puncture wound in a carbon black reinforced rubber innerliner, crown region, tread and/or sidewall of said tire, and/or (B) identify the presence of the built-in non-black colored sealant in the tire, such as for example, in a tire retreading operation to physically detect the presence of the built-in sealant by its visually contrasting non-black colored appearance in the case of an open wound in a carbon black reinforced rubber innerliner or by a relatively softness of the rubber innerliner layer itself as a result of the associated underlying built-in sealant layer.

Accordingly, in an additional accordance with this invention, the tire is provided as having said non-black colored built-in sealant layer having the capability of visibly identifying a puncture wound which extends through a black colored carbon black reinforced tire rubber innerliner layer, black colored carbon black reinforced tire rubber tread and/or black colored carbon black reinforced tire rubber sidewall layer to said built-in sealant layer by a physical flow of a portion of said non-black colored built-in sealant layer through said puncture wound to form a contrastingly non-black colored sealant on a visible surface of said black colored carbon black reinforced innerliner, tread or sidewall.

In practice, as hereinbefore discussed, where a synthetic amorphous silica is used (e.g. a precipitated silica), said synthetic amorphous silica may be treated by treatment prior to addition of said organoperoxide either in situ within the rubber composition or by pre-treatment of the silica prior to its addition to the rubber composition with:

(A) a polyethylene glycol having a weight average molecular weight in a range of from about 2,000 to about 15,000, alternately about 2,000 to about 10,000, or (B) an alkoxysilane or (C) a coupling agent selected from a bis(3-trialkoxysilylalkyl)polysulfide or organomercaptoalkoxysilane, or (D) a combination of alkylsilane, particularly an alkoxysilane, and bis(3-trialkoxysilylalkyl)polysulfide or organomercaptoalkoxysilane.

Accordingly, in one aspect of the invention, said synthetic amorphous silica may be a composite of precipitated silica and (A) said polyethylene glycol, or (B) alkoxysilane, or (C) a coupling agent selected from a bis(3-trialkoxysilylalkyl)polysulfide or organomercaptoalkoxysilane, or (D) a combination of alkylsilane, particularly an alkoxysilane, and bis(3-trialkoxysilylalkyl)polysulfide or organomercaptoalkoxysilane.

Representative examples of polyethylene glycols are polyethylene glycols having an average (weight average) molecular weight in a range of from about 2,000 to about 15,000, alternately from about 2,000 to about 10,000, are preferred.

Examples of commercially available polyethylene glycols may be, for example, those such as Carbowax™ PEG 3350 as well as Carbowax™ PEG 8000 from the Dow Chemical Company with said Carbowax™ PEG 8000 reportedly having a weight average molecular weight in a range of about 7,000 to about 9,000 as determined by its NIR (near infrared) method 1B-ZMETH1.3. A further discussion concerning various polyalkylene oxide polymers, and particularly polyethylene glycols including said Carbowax PEG 8000 may be found, for example, although not intended to be limitive, in U.S. Pat. Nos. 6,322,811 and 4,082,703.

Said bis(3-trialkoxysilylalkyl)polysulfide, preferably a bis (3-triethoxysilylpropyl)polysulfide, contains an average of from 2 to about 4, preferably an average of from about 2 to about 2.6 or an average of from about 3.5 to about 4, connecting sulfur atoms in its polysulfidic bridge;

Said alkoxysilane may be of the general formula (I):

$(RO)_3—Si—R^1$      (I)

where R is selected from methyl and ethyl radicals, preferably ethyl radicals, and $R^1$ is a saturated alkyl radical having from 2 through 6 carbon atoms.

Representative of said alkoxysilanes are, for example, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

Said organomercaptoalkoxysilane may be of the general formula (II):

$(X)_n(R^2O)_{3-n}—Si—R^3—SH$      (II)

wherein X is a radical selected from chlorine, bromine, and alkyl radicals having from one to 16 carbon atoms; wherein $R^2$ is an alkyl radical selected from methyl and ethyl radicals, $R^3$ is an alkylene radical having from one to 16 carbon atoms an n is a value from zero to 3.

Representative of alkoxyorganomercaptosilanes, particularly for pre-treatment of the silica prior to its addition to the rubber composition are, for example, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, and tripropoxy mercaptopropyl silane.

In practice, various conventional clays may be used. Representative of such clays are, for example, kaolin clays. It is envisioned herein that a benefit of utilization of such conventional clay is to provide a modified, or tempered, degree of reinforcement, as compared to the silica, for the sealant precursor composition to aid in its aforesaid processing and also to aid, in combination with the silica, in providing a suitable stiffness and associated dimensional integrity for the partially depolymerized butyl rubber-based sealant composition.

In practice, exfoliated, intercalated water swellable clays can be used in which a significant portion of the clay is present in a form of exfoliated clay platelets. Representative of such clays are, for example, montmorillonite clays and hectorite clays as well as vermiculite for a purpose of also adding a degree of reinforcement.

In practice, the calcium carbonate may also be used. As with the aforesaid conventional clays and exfoliated clay platelets, it is envisioned that a benefit of utilization of such calcium carbonate is to provide a modified, or tempered, degree of reinforcement, as compared to the silica, for the sealant precursor composition to aid in its aforesaid processing and also to aid, in combination with the silica, in providing a suitable stiffness, and associated dimensional integrity for the partially depolymerized butyl rubber-based sealant composition.

For this invention, various synthetic amorphous silicas may be used in a form of a precipitated silica, which may be used to prepare the pre-hydrophobated silica representative of which are, for example and not intended herein to be limitative, HiSil 532™ from PPG Industries, Hubersil 4155™ from the J. M. Huber Company and Ultrasil™ VN2 and VN3 from the Degussa Company.

Such precipitated silicas are silica aggregates which are considered herein to be in an agglomerated (compacted) form with relatively very low BET (nitrogen) surfaces areas (e.g. reportedly about 60 $m^2$/g for the HiSil 532™ and Hubersil 4155™ silica aggregates, provided in an agglomerated form).

A method of measuring BET (nitrogen) surface area of precipitated silicas is ASTM D 1993-91, *Standard Test Method for Precipitated Silica-Surface Area by Multipoint BET Nitrogen Adsorption* which relates to the conventional theory described by Brunauer, Emmett and Teller in the *Journal of the American Chemical Society*, Volume 60, (1938), Page 309.

The optional various rubber processing oils are well known to those having skill in such art. For this invention, a rubber processing oil having a low aromaticity content is preferred, namely a rubber processing oil having an aromaticity content of less than about 15 weight percent. Such a preferred rubber processing oil may be composed of, for example, about 35 to about 45 weight percent naphthenic content, about 45 to about 55 weight percent paraffinic content and an aromatic content of less than about 15 weight percent (e.g. from about 10 to about 14 weight percent). It is considered herein that a representative of such preferred rubber processing oil is Tufflo 100™ from the Barton Solvent Company. The rubber processing oil, in relatively low concentrations, is seen herein to aid in mixing the ingredients for the sealant precursor composition and to aid in promoting the aforesaid processing of sealant precursor composition.

The optional short fibers may be selected from, for example, cotton fibers and from synthetic fibers selected from rayon, aramid, nylon and polyester fibers, and their mixtures. In practice, such cotton short fibers may have an average length, for example, in a range of up to about 200 microns (e.g. an average length of about 150 microns) and the synthetic (e.g. the polyester and nylon fibers) may have an average length, for example, of up to a maximum of about 2,500 microns. The short fibers are considered herein to aid in promoting the effectiveness of the sealing ability of the resultant sealant composition. In relatively low concentrations, such synthetic fibers are not seen herein as significantly interfering with the processing of the sealant precursor composition yet as promoting the effectiveness of the resultant built-in sealant layer for its puncture sealing ability.

In practice, the colorant may be comprised of titanium dioxide. For example, the colorant of such sealant composition may preferably be composed of titanium dioxide where a white colored sealant layer is desired. Also, such colorant may contain, or be comprised, of titanium dioxide as a color brightener together with at least one non-black organic pigment and/or non-black inorganic pigment or dye.

Various colorants may be used to provide a non-black color to the sealant and sealant precursor composition. Representative of such colorants are, for example, yellow colored colorants as Diarylide Yellow™ pigment from PolyOne Corporation and Akrosperse E-6837™ yellow EPMB pigment masterbatch with an EPR (ethylene/propylene rubber) from the Akrochem Company. As discussed above, such colorant may be used in combination with titanium dioxide with the titanium dioxide being somewhat of a brightener for the colorant.

Various organoperoxides may be used for the sealant precursor butyl rubber-based composition. Preferably organoperoxides are used which become active (e.g. generate peroxide free radicals) at high temperatures, that is, for example, above about 100° C. Such organoperoxides are referred to therein as active peroxides. Examples of such organoperoxides which are considered herein as being active organoperoxides are, for example, tertbutyl perbenzoate and dialkyl peroxides with the same or different radicals, such as dialkylbenzene peroxides and alkyl pre-esters. Preferably the active organoperoxide will contain two peroxide groups. Frequently the peroxide groups are attached to a tertiary butyl group. The basic moiety on which the two peroxide groups are suspended can be aliphatic, cycloaliphatic, or aromatic radicals. Some representative examples of such active organoperoxides are, for example, n-butyl 4,4-di-(tert-butylperoxy)valerate, 2,5-bis(t-butyl peroxy)-2,5-dimethyl hexane; 1,1-di-t-butyl peroxi-3,3,5-trimethyl cyclohexane; 2,5-dimethyl-2,5-di(t-butyl peroxy)hexyne-3; p-chlorobenzyl peroxide; 2,4-dichlorobenzyl peroxide; 2,2-bis-(t-butyl peroxi)-butane; di-t-butyl peroxide; benzyl peroxide; 2,5-bis(t-butyl peroxy)-2,5-dimethyl hexane, dicumyl peroxide; and 2,5-dimethyl-2,5-di(t-butyl peroxy) hexane. The n-butyl 4,4-di-(tert-butylperoxy) valerate may be a preferred organoperoxide for use in the depolymerizing of the butyl rubber or composite of butyl rubber together with cis 1,4-polyisoprene rubber and/or liquid cis 1,4-polyisoprene polymer of the butyl rubber containing sealant precursor.

Such organoperoxide may be provided on a mineral carrier such as, for example calcium carbonate or a combination of calcium carbonate and calcium silicate. For example, the n-butyl 4,4-di-(tert-butylperoxy)valerate may be provided as a composite with a mineral carrier. Such mineral carrier may be, for example, combination of calcium carbonate and calcium silicate such as, for example, as Trigonox 17-40B-pd™ from the Akzo Nobel Polymer Chemicals LLC Company.

Thus, such active organoperoxides may be added to the sealant precursor butyl rubber-based composition layer usually as a composite with an inert, free-flowing mineral carrier, such as, for example, calcium carbonate. The organoperoxide as a composite thereof with a mineral carrier, such as for example calcium carbonate, is preferred for storing the peroxide and handling and processing. Such composite may be composed of, for example, from about 35 to 60 weight percent of the active organoperoxide.

In practice, a pneumatic tire having a puncture sealing ability comprised of an assembly of components comprised of an outer circumferential (sulfur curable) rubber tread, (sulfur curable) rubber carcass supporting said tread and an inner layer, may be prepared by, for example:

(A) positioning a layer of said uncured butyl rubber-based rubber composition, exclusive of sulfur curative, as a sealant layer precursor between said innerliner and rubber carcass barrier layer which contains said butyl rubber, or composite of said butyl rubber together with said organoperoxide and said 2,2,6,6-tetra alkyl piperidine based hindered amines, and particularly said PTP or composites of 2,2,6,6-tetra alkyl piperidine based hindered amines which are comprised of (include) said PTP;

(B) vulcanizing said tire assembly in a suitable mold at a temperature in a range of from about 130° C. to about 175° C. for a sufficient period of time to partially depolymerize said butyl rubber and thereby form a built-in sealant layer.

In practice, it is conventionally preferred that the butyl rubber are blended in at least one sequential preparatory, or non-productive, mixing stage in the absence of the organoperoxide followed by a final, or productive, mixing stage in which the organoperoxide (and possibly one or more of the additional ingredients) is added. The said 2,2,6,6-tetra alkyl piperidine based hindered amines, and particularly said PTP or composites of 2,2,6,6-tetra alkyl piperidine based hindered amines which comprise (contain) said PTP may be similarly added during the final, or productive, mixing stage.

Conventionally, the non-productive mixing stage(s) may be conducted, for example, by mixing the ingredients to a temperature in a range of from about 110 to about 150° C. and the subsequent productive mixing stage may be conducted, for example, by mixing the ingredients to a temperature in a range of from about 85 to about 100° C.

A significant aspect of this invention is the at least partial depolymerization of the butyl rubber-based sealant precursor layer built into the tire (between the tire innerliner and tire carcass) occurs during the vulcanization of the tire itself in a suitable mold at an elevated temperature via said activated organoperoxide in the presence of the said 2,2,6,6-tetra alkyl piperidine based hindered amines, and particularly said PTP or composites of 2,2,6,6-tetra alkyl piperidine based hindered amines which comprise (contain) said PTP.

This is considered herein to be significant because said butyl rubber-based sealant precursor composition is conveniently processable as a rubber composition which can be suitably built as a rubber layer into a tire.

In practice, upon vulcanization of the tire assembly under conditions of elevated temperature, a major portion of the uncured butyl rubber composition is considered herein to be depolymerized in the presence of the activated organoperoxide.

In practice, said tire innerliner halobutyl rubber-based layer is typically a sulfur curative-containing halobutyl rubber composition of a halobutyl rubber such as for example chlorobutyl rubber or bromobutyl rubber.

Such tire halobutyl rubber-based innerliner layer may also contain one or more sulfur curable diene-based elastomers such as, for example, cis 1,4-polyisoprene natural rubber, cis 1,4-polybutadiene rubber and styrene/butadiene rubber, and their mixtures, or more preferably a combination of one or more of said halobutyl rubbers and said diene based elastomers.

As the tire is vulcanized together with the butyl rubber-based rubber composition layer (the sealant layer precursor) sandwiched between the tire carcass and the tire's rubber innerliner, the butyl rubber of the butyl rubber-based composition layer which is to become the sealant layer, becomes partially depolymerized by action of the activated organoperoxide.

In effect, the butyl rubber or combination of butyl rubber together with the cis 5,4-polyisoprene rubber and/or cis 1,4-liquid polyisoprene polymer in the butyl rubber based composition sealant layer is transformed into a puncture sealant layer during the curing of the tire. This at least partial depolymerization of the butyl rubber-based composition layer is effected by the presence of the one or more activated free radical-generating organoperoxides contained in the butyl rubber sealant precursor composition.

The various components of the sealant layer can be mixed together using convenient rubber mixing equipment, particularly an internal rubber mixer. The rubber composition used in the sealant precursor layer typically has sufficient viscosity and unvulcanized tack to enable its incorporation into an unvulcanized tire without significantly departing from conventional tire building techniques.

In an exemplary method of this invention, the butyl rubber-based sealant precursor composition can be formed into a rubber strip by using conventional equipment such as a calender, extruder, or any combination thereof, and the rubber strip assembled into the tire. In building the tires of this invention a rubber innerliner of a butyl rubber based (e.g. bromobutyl rubber) rubber composition is first applied to a building drum and then the strip of butyl rubber based sealant precursor layer is applied to the layer of innerliner and thereafter the remainder of various carcass plies and layers of the tire assembly. The butyl rubber based sealant precursor layer is thereby assembled into the unvulcanized tire assembly of components between an innerliner layer and tire carcass.

The built-in sealant layer may, for example, be positioned between a tire innerliner rubber layer and tire carcass or between two tire innerliner rubber layers wherein said sealant layer may:

(A) extend from one shoulder of the tire to the other through the crown region of the tire;

(B) be positioned in at least one tire shoulder area region and extend into at least a portion of the adjoining tire sidewall portion of the tire, or (C) extend from sidewall-to-sidewall through the tire crown region.

The thickness of the sealant composition layer can vary greatly in an unvulcanized puncture sealant containing tire. Generally, the thickness of the sealant composition layer may range from about 0.13 cm (0.05 inches) to about 1.9 cm (0.75 inches). In passenger tires it is normally desired for the sealant composition layer to have a thickness of about 0.32 cm (0.125 inches) whereas for truck tires, a thickness of about 0.76 cm (0.3 inches) or greater might be desired.

After the unvulcanized pneumatic rubber tires of this invention are assembled they are vulcanized using a normal tire cure cycle. The tires of this invention can be cured over a wide temperature range. For example, passenger tires might be cured at a temperature ranging from about 130° C. to about 170° C. and truck tires might be cured at a temperature ranging from about 130° C. to about 170° C. Thus, a cure temperature may range, for example, from about 130° C. to about 170° C. and for a period of time (e.g. from about 10 to about 45 minutes or more depending somewhat upon the size of the tire and the degree of desired depolymerization of the butyl rubber as well as the thickness of the sealant layer itself) and sufficient to at least partially depolymerize said sealant precursor layer.

Accordingly, in one aspect of the invention, a self-sealing pneumatic rubber tire of this invention is envisioned wherein the tire has sidewalls, a supporting carcass, inextensible beads, an innerliner (air barrier layer), a sealant layer, and an outer circumferential tread (tread portion). The individual sidewalls extend radially inward from the axial outer edges of the tread portion to join the respective inextensible beads. The supporting carcass acts as a supporting structure for the tread portion and sidewalls. The sealant layer is disposed between said supporting carcass and said innerliner. The outer circumferential tread is adapted to be ground contacting when the tire is in use.

EXAMPLE I

Comparative Basic Sealant Composition

A butyl rubber-based sealant precursor composition is prepared by mixing ingredients in an internal mixer. The ingredients are mixed in a first, non-productive, mixing stage without the organoperoxide followed by a second, productive, mixing stage in which the organoperoxide is added. The ingredients are illustrated in the following Table 1 in which the precursor composition is identified as Sample X. The parts and percentages are by weight unless otherwise indicated.

TABLE 1

| Material | Parts Sample X |
|---|---|
| First (Non-Productive) Mixing Step (for about 2 to 3 minutes to about 120° C.) | |
| Butyl rubber[1] | 100 |
| Amorphous silica[2] | 20 |
| Clay[3] | 10 |
| Polyethylene glycol[4] | 0.25 |
| Rubber processing oil[5] | 3 |
| Titanium dioxide pigment | 2 |
| Colorant as a yellow colored pigment masterbatch[6] | 0.5 |

[1]Butyl rubber as Exxon 068 ™ from the ExxonMobil Company, having a Mooney (1 + 8) viscosity at 125° C. of about 51, as a copolymer of isobutylene and isoprene having less than one percent units derived from isoprene
[2]Amorphous precipitated silica as Hubersil 4155 ™ from J. M. Huber Company
[3]Kaolin clay as RC-32 ™ from Thiele Kaolin Company
[4]Polyethylene glycol having a weight average molecular weight of about 8,000 (understood to be about plus or minus about 1,000) as Carbowax PEG 8000 ™ from the Dow Chemical Company
[5]Rubber processing oil as Tufflo 100 ™ from Barton Solvents Company reportedly a naphthenic, paraffinic rubber processing oil having a maximum aromatic content of less than 15 weight percent
[6]A yellow colored organic/inorganic pigment as Stan-tone ™ D1102 (Excell Polymer LLC Company)
[7]Composite of n-butyl 4,4-di-(tert-butylperoxy) valerate with a mineral carrier as a combination of calcium carbonate and calcium silicate as Trigonox 17-40B pd ™ from the Akzo Nobel Polymer Chemicals LLC company in a 40/60 weight ratio of the organoperoxide to carrier and reported in Table 1 as the composite

EXAMPLE II

An activated organoperoxide depolymerized butyl rubber sealant composition is prepared by an inclusion of a 2,2,6,6-tetra alkyl piperidine based hindered amine comprised of poly[[6-[1,1,3,3,-tetramethylbutyl)amino]-s-triazine-2,4-diyl][2,2,6,6,-tetramethyl-4-piperidyl)imino]hexamethylene [(2,2,6,6-tetramethyl-4-piperidy)imino]] compound, or PTP, in the sealant precursor composition of Example I as follows in Table 2 and heated to a temperature of about 150° C. to for about 20 minutes to depolymerize the butyl rubber and thereby form the sealant composition.

The Samples are referred to herein as Control Samples A1 and A2 and Experimental Samples B1, B2, C1, C2, D1 and D2.

Control Sample A1 and Experimental Samples B1, C1 and D1 contained 12 phr of the organoperoxide.

Control Sample A2 and Experimental Samples B2, C2 and D2 contained a significantly reduced amount of 9 phr of the organoperoxide.

All of the Experimental Samples contained the PTP compound.

In particular, the "Peroxide Activator C" used for Samples D1 and D2 is, basically, the PTP compound.

In particular, the "Peroxide Activator A" and "Peroxide Activator" are compounds which contain, and therefore are comprised of, the PTP compound.

Accordingly, experimental Samples B1, B2, C1 and C2 contained what are referred to herein as "Peroxide Activator A" and "Peroxide Activator B" which contained the PTP as a part of their compositions.

Experimental Samples D1 and D2 contained the PTP in an isolated form (Peroxide Activator C).

TABLE 2

| Material, mixed 1-2 min at 93° C. | Samples |
| --- | --- |
| | Control | | | | | | | |
| | A1 | A2 | B1 | B2 | C1 | C2 | D1 | D2 |
| Sealant Precursor of Example I, 135.75 parts by weight for all of the Samples | | | | | | | | |
| Organoperoxide[1] | 12 | 9 | 12 | 9 | 12 | 9 | 12 | 9 |
| Peroxide Activator A, containing PTP[2] | 0 | 0 | 2 | 2 | 0 | 0 | 0 | 0 |
| Peroxide Activator B, containing PTP[3] | 0 | 0 | 0 | 0 | 2 | 2 | 0 | 0 |
| Peroxide Activator C, as said PTP[4] | 0 | 0 | 0 | 0 | 0 | 0 | 2 | 2 |

[1]Organoperoxide as a composite of n-butyl 4,4-di-(tert-butylperoxy) valerate with a mineral carrier as a combination of calcium carbonate and calcium silicate as Trigonox 17-40B pd ™ from the Akzo Nobel Polymer Chemicals LLC company in a 40/60 weight ratio of the organoperoxide to carrier and reported in Table 1 as the composite.
[2]Organoperoxide activator (A) as Ciba Irgastab FS410 FF from the Ciba Company composed of a 50/50 mixture of amines, bis(hydrogenated tallow alkyl), oxidized, and said PTP
[3]Organoperoxide activator (B) as Ciba Irgastab FS811 FF from the Ciba Company composed of amines, bis(hydrogenated tallow alkyl), oxidized, bis(2,2,6,6-tetramethyl-4-piperdinyl) sebacate and said PTP
[4]Organoperoxide activator (C) as Ciba Chimassorb 944 FDL from the Ciba Company composed of said PTP Various physical properties of the Samples of Table 2 are reported in the following Table 3.

It can further be seen from Table 3 that a reduced peroxide content of 9 phr in Control Sample A2, as compared to the higher peroxide level of 12 phr for the Control Sample A1, resulted in a higher storage modulus (G') of 38.25 kPa instead the 24.44 kPa obtained for Control Sample A1.

Significant reductions of storage modulus (G') of Samples B1, C1 and D1 were obtained when 2 phr of Activator (A), Activator (B) and Activator (C) were added, respectively, as compared to Control Sample A1 which did not use an "Activator". This suggests that a reduction of the organoperoxide might be made for the production of the built-in sealant when the Activator comprised of the PTP is added.

Accordingly, it was found that the storage modulus (G') obtained for Samples B2, C2 and D2, which used a reduced amount of the organoperoxide, are comparable for the storage modulus obtained for Control Sample A1 (with the increased amount of organoperoxide) and therefor confirm that use of the PTP containing Activator can result in a reduced amount of the organoperoxide to obtain comparable storage modulus (G') property.

This is considered herein to be desirable in order to promote a significant reduction of the concentration of the organoperoxide in the butyl rubber-based sealant precursor composition, as well as to reduce an excess organoperoxide which may otherwise remain in the resulting built-in sealant layer within the tire which may, in turn, gradually become available to contact rubber components of the tire adjacent to the built-in sealant layer.

While certain representative embodiments and details have been shown for the purpose of illustrating the invention, it will be apparent to those skilled in this art that various changes and modifications may be made therein without departing from the spirit or scope of the invention.

What is claimed is:

1. A process of providing a pneumatic rubber tire having a built-in puncture sealing layer, which comprises:
    (A) building a tire having a built-in puncture sealing precursor layer of a composition comprised of butyl rubber, organoperoxide, polyethylene glycol and an activating

TABLE 3

| Properties | Samples |
| --- | --- |
| | Control | | | | | | | |
| | A1 | A2 | B1 | B2 | C1 | C2 | D1 | D2 |
| RPA, cure at 150° C. for 20 min; measurements cured and uncured at 100° C., 5% strain, 1.0 Hz[4] | | | | | | | | |
| Storage modulus, uncured G', kPa | 317.71 | 311.33 | 261.39 | 267.77 | 260.33 | 274.14 | 276.27 | 284.77 |
| Storage modulus, cured G', kPa | 24.439 | 38.253 | 13.813 | 25.502 | 9.563 | 23.377 | 11.688 | 22.314 |

[4]Data obtained according to Rubber Process Analyzer as RPA 2000 ™ instrument by Alpha Technologies, formerly the Flexsys Company and formerly the Monsanto Company. References to an RPA-2000 instrument may be found in the following publications: H. A. Palowski, et al, Rubber World, June 1992 and January 1997, as well as Rubber & Plastics News, Apr. 26, and May 10, 1993.

It can be seen from Table 3 that for Control Sample A1 (containing 12 phr of organoperoxide without the hindered amine activator), a storage modulus (G') of 24.44 kPa is obtained. It is considered herein that this level of storage modulus (G') for the Sample is suitable to allow for an appropriate flow of the rubber based composition containing the partially depolymerized butyl rubber as a built-in tire sealant layer.

agent for said organoperoxide, wherein said activating agent is a 2,2,6,6-tetra alkyl piperidine hindered amine, and
    (B) partially depolymerizing said butyl rubber in situ within said puncture sealing precursor layer in said tire with free radicals generated by said organoperoxide, wherein said free radical generation by said organoperoxide is activated and promoted by said activating agent in situ within said puncture sealing layer to thereby more efficiently partially depolymerize said butyl rubber and thereby form said built-in puncture sealing layer, wherein said 2,2,6,6-tetra alkyl piperidine hindered amine is comprised of:
(1) poly[[6-[1,1,3,3,-tetramethylbutyl) amino]-s-triazine-2,4-diyl][2,2,6,6,-tetramethyl-4-piperidyl)imino]hexamethylene[(2,2,6,6-tetramethyl-4-piperidyl)imino]]compound,
(2) bis (2,2,6,6-tetramethyl-4-piperidinyl) sebacate, or
(3) their mixture wherein said butyl rubber is a copolymer comprised of isobutylene and isoprene and wherein said butyl rubber is comprised of about 0.5 to about 1 percent units derived from isoprene, and correspondingly from about 99 to 99.5, weight percent units derived from isobutylene.

2. The process of claim 1 wherein said 2,2,6,6-tetra alkyl piperidine hindered amine is comprised of poly[[6-[1,1,3,3,-tetramethylbutyl) amino]-s-triazine-2,4-diyl][2,2,6,6,-tetramethyl-4-piperidyl)imino]hexamethylene[(2,2,6,6-tetramethyl-4-piperidyl)imino]]compound.

3. The process of claim 1 wherein said sealant precursor layer composition is comprised of said butyl rubber, organoperoxide and activating agent, and, based upon parts by weight per 100 parts by weight rubber (phr);
(A) about 25 to about 100 phr particulate reinforcing filler comprised of:
(1) about 25 to about 100 phr of precipitated silica and from zero up to about 5 phr of carbon black, so long as said sealant layer is of a non-black color, wherein said carbon black is a rubber reinforcing carbon black, or;
(2) about 5 to about 50 phr of precipitated silica and from 10 to about 50 phr of carbon black so long as the sealant layer is of a black color, wherein said carbon black is a rubber reinforcing carbon black;
(3) from zero to 20 phr of additional filler comprised of at least one of clay calcium carbonate and corn cob granules or their mixtures;
(B) from zero to 6 phr of short organic fibers;
(C) optionally a colorant of other than a black color, where it is desired that said sealant layer is of a non-black color, wherein said colorant is comprised of at least one of organic pigments, inorganic pigments and dyes, preferably from organic pigments and inorganic pigments;
(D) from zero to about 20 phr of rubber processing oil.

4. The process of claim 3 wherein said precipitated silica is treated by treatment prior to addition of said organoperoxide either in situ within the rubber composition or by pre-treatment of the silica prior to its addition to the rubber composition with a polyethylene glycol having a weight average molecular weight in a range of from about 2,000 to about 15,000.

5. The process of claim 1 wherein said sealant layer is positioned between a carbon black reinforced rubber innerliner layer and tire carcass or between two carbon black reinforced rubber tire innerliner layers.

6. A tire having a built-in sealant layer prepared by the process of claim 1.

7. A tire having a built-in sealant layer prepared by the process of claim 3.

8. A tire having a built-in sealant layer prepared by the process of claim 4.

9. A pneumatic rubber tire having a built-in puncture sealing layer;

wherein said puncture sealing layer is comprised of an organoperoxide-partially depolymerized butyl rubber and activation agent for said organoperoxide;

wherein said activation agent is a 2,2,6,6-tetra alkyl piperidine hindered amine, and wherein said 2,2,6,6-tetra alkyl piperidine hindered amine is comprised of:
(A) poly[[6-[1,1,3,3,-tetramethylbutyl) amino]-s-triazine-2,4-diyl][2,2,6,6,-tetramethyl-4-piperidyl)imino]hexamethylene[(2,2,6,6-tetramethyl-4-piperidyl)imino]] compound,
(B) bis (2,2,6,6-tetramethyl-4-piperidinyl) sebacate, or
(C) their mixture.

10. The tire of claim 9 wherein said built-in sealant layer is covered by at least one tire rubber innerliner layer.

11. The tire of claim 9 wherein said built-in puncture sealing layer is a rubber composition comprised of, based upon parts by weight per 100 parts by weight partially depolymerized polymer comprised of butyl rubber (phr):
(A) organoperoxide partially depolymerized polymer comprised of an activated organoperoxide partially depolymerized rubber as an organoperoxide partially depolymerized butyl rubber;
wherein said activated organoperoxide is an organoperoxide activated by an inclusion in said rubber composition of said 2,2,6,6-tetra alkyl piperidine hindered amine,
wherein said butyl rubber is a copolymer comprised of isobutylene and isoprene comprised of about 0.5 to about 5 percent units derived from isoprene, and correspondingly from about 95 to about 99.5 weight percent units derived from isobutylene;
(B) about 25 to about 100 phr particulate reinforcing filler comprised of:
(1) about 25 to about 100 phr of precipitated silica and from zero up to about 5 phr of carbon black, so long as said sealant layer is of a non-black color, wherein said carbon black is a rubber reinforcing carbon black, or;
(2) about 5 to about 50 phr of precipitated silica and from 10 to about 50 phr of carbon black so long as the sealant layer is of a black color, wherein said carbon black is a rubber reinforcing carbon black;
(3) from zero to 20 phr of additional filler comprised of at least one of clay and calcium carbonate or their mixtures;
(C) from zero to 6 phr of short organic fibers;
(D) optionally a colorant of other than a black color, where it is desired that said sealant layer is of a non-black color, wherein said colorant is comprised of at least one of organic pigments, inorganic pigments and dyes, preferably from organic pigments and inorganic pigments;
(E) from zero to about 20 phr of rubber processing oil having a maximum aromatic content of about 15 weight percent, and a naphthenic content in a range of from about 35 to about 45 weight percent and paraffinic content in a range of about 45 to about 55 weight percent.

12. The tire of claim 11 wherein said precipitated silica is treated by treatment prior to addition of said organoperoxide either in situ within the rubber composition or by pre-treatment of the silica prior to its addition to the rubber composition with a polyethylene glycol having a weight average molecular weight in a range of from about 2,000 to about 15,000.

* * * * *